(12) United States Patent
Miller

(10) Patent No.: US 6,421,131 B1
(45) Date of Patent: Jul. 16, 2002

(54) BIREFRINGENT INTERFEROMETER

(75) Inventor: Peter J. Miller, Newburyport, MA (US)

(73) Assignee: Cambridge Research & Instrumentation Inc., Boston, MA (US)

( * ) Notice: Subject to any disclaimer, the term of this patent is extended or adjusted under 35 U.S.C. 154(b) by 0 days.

(21) Appl. No.: 09/607,836

(22) Filed: Jun. 30, 2000

Related U.S. Application Data

(60) Provisional application No. 60/142,282, filed on Jul. 2, 1999.

(51) Int. Cl.[7] .................................................. G01B 9/02
(52) U.S. Cl. ......................................................... 356/453
(58) Field of Search ................................. 356/453, 456, 356/491, 451, 364, 368

(56) References Cited

U.S. PATENT DOCUMENTS

| | | | |
|---|---|---|---|
| 4,272,195 A | * | 6/1981 | Kaye .......................... 356/368 |
| 4,394,069 A | | 7/1983 | Kaye |
| 4,444,469 A | | 4/1984 | Kaye |
| 4,497,542 A | | 2/1985 | Kaye |
| 4,848,877 A | | 7/1989 | Miller |
| 4,905,169 A | | 2/1990 | Buican et al. |
| 5,117,466 A | | 5/1992 | Buican et al. |
| 5,132,826 A | * | 7/1992 | Johnson et al. ............... 349/18 |
| 5,216,484 A | | 6/1993 | Chao et al. |
| 5,247,378 A | * | 9/1993 | Miller .......................... 349/18 |
| 5,377,003 A | | 12/1994 | Lewis et al. |
| 5,539,517 A | | 7/1996 | Cabib et al. |
| 5,600,440 A | | 2/1997 | Bendall |
| 5,689,314 A | | 11/1997 | Mercer |
| 5,784,162 A | | 7/1998 | Cabib et al. |
| 5,835,214 A | | 11/1998 | Cabib et al. |
| 5,838,441 A | | 11/1998 | Satorius et al. |
| 5,841,536 A | * | 11/1998 | Dimmick .................... 356/453 |

OTHER PUBLICATIONS

Multispectral imaging with a liquid crystal tunable filter, Miller et al, SPIE vol. 2345, 1995, pp. 354–365.*

* cited by examiner

Primary Examiner—Samuel A. Turner
(74) Attorney, Agent, or Firm—Cohen, Pontani, Lieberman & Pavane

(57) ABSTRACT

A birefringent interferometer system is described which uses nematic liquid crystal cells to produce variable optical path differences (OPD) between light of different polarization states that are interfered at a polarizing analyzer. Fixed retarders may also be incorporated to extend the range of OPD. The interferometer provides wide field-of-view, continuously variable path difference over a large range, and an on-board monitor of OPD for ensuring accurate settings of path difference, and hence, an accurate wavelength scale in the spectra produced by the apparatus. The system can further incorporate additional polarizing optics so it responds equally well to light of any incident polarization state without loss of efficiency.

35 Claims, 11 Drawing Sheets

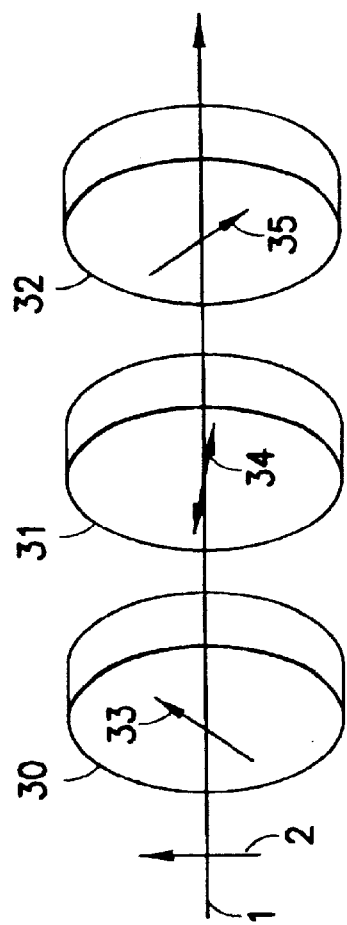
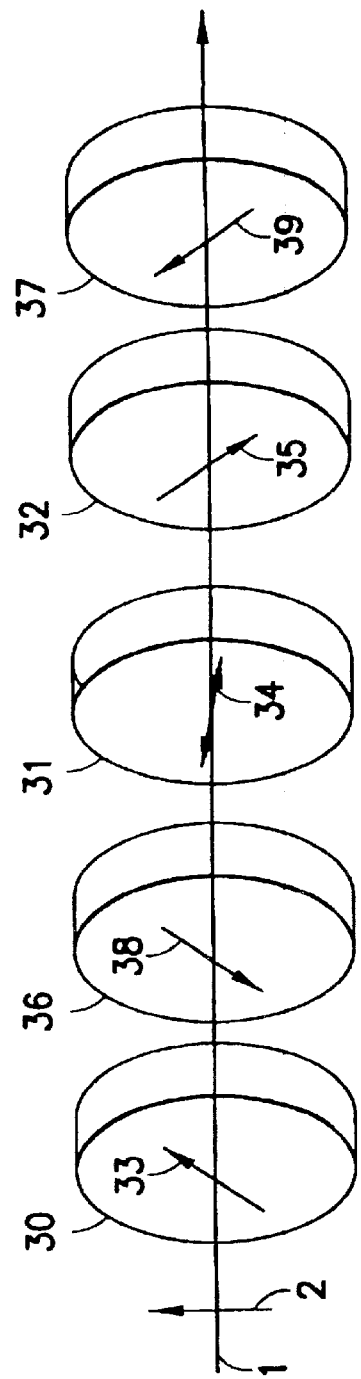

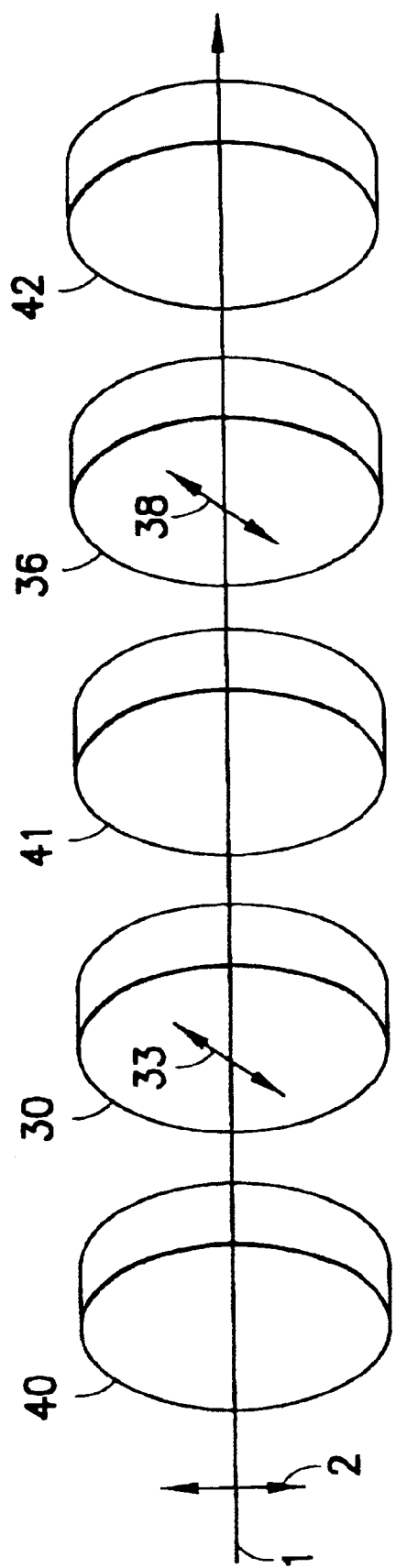

BIREFRINGENT INTERFEROMETER

RELATED APPLICATIONS

This application claims priority from U.S. Provisional Patent Application Ser. No. 60/142,282 which was filed on Jul. 2, 1999. The contents of which are incorporated herein by reference.

BACKGROUND OF THE INVENTION

1. Field of the Invention

The field of the invention is spectral imaging, specifically spectral measurement which utilizes optical interference to determine spectral content, and which is capable of determining the spectral content at every point in a one- or two-dimensional image or scene.

2. Description of the Related Art

Optical interference is widely used in instruments such as the Michelson interferometer, the Mach-Zender interferometer, the Twyman-Greene interferometer, the Sagnac interferometer, and others. These divide incident light into two or more beams traveling along different paths, which are then recombined. An optical path difference is developed between the paths, which results in constructive or destructive interference, depending on the wavelength of light and on the optical path difference (OPD). The intensity pattern resulting from this interference is termed an interferogram. By observing the interferogram while varying the path difference, one can deduce the wavelength of light present in a monochromatic incident beam, or the amount of each wavelength component in a polychromatic beam. This spectrum is obtained by means of a Fourier transform of the intensity signal, for which reason these instruments are often termed Fourier transform spectrometers, or FTS instruments.

The spectral resolving power of an FTS instrument depends directly on the range of OPD that can be produced. Usually, the OPD is varied by mechanical means, such as actuators or piezeo-electric crystals. This involves the motion or rotation of one or more optical elements, such as mirrors or windows, which leads to high cost and complexity given the need to control the OPD variation to a small fraction of a wavelength of light. Other means are also used for varying path length. In some cases an electro-optic material is present in one or more of the optical paths, and the OPD is varied electro-optically. However, this normally results in a limited range of adjustment, as the modulation range of most electro-optic modulators is limited to approximately one wavelength of light. In other cases, one path contains a cell or vessel which may be evacuated or pressurized with gases, to produce an OPD change via the change in refractive index.

It is common practice to incorporate some means for measuring the change in OPD, often via a laser reference beam. In these arrangements, the laser travels along the same paths as the light being analyzed, or travels an equivalent path located adjacent the aperture region, and its output is observed as the OPD is varied. This is especially common in mechanically-varied systems, or in systems which provide a large change in OPD, for which it is otherwise difficult to determine the exact OPD achieved by the system. These systems are generally complex, mechanically delicate, and thermally sensitive.

Most FTS systems provide a spectrum for the incident beam as a whole, and cannot provide spectra for each point in a two-dimensional input scene; thus they are termed non-imaging spectrometers. However, a few imaging FTS systems have been built. Such systems typically sense the interferogram using a pixelated detector such as a CCD or CID sensor. Cabib teaches in U.S. Pat. No. 5,835,214 the use of low-finesse Fabry-Perot interferometers and interferometers which split the incident beam into a finite number of beams, for the purpose of imaging an entire scene at once and obtaining spectral information about each pixel. Cabib describes several interferometers, in U.S. Pat. No. 5,835,214, in U.S. Pat. No. 5,784,162, and in U.S. Pat. No. 5,539,517. Depending on the optical design of the instrument, a given pixel on the sensor may correspond with a given point in the scene being imaged for all OPD settings, or it may not. For example, an instrument is commercially available from Applied Spectral Imaging, in Migdal Haemek, Israel. In this instrument, the relationship between pixel location and scene location varies as the OPD is changed. A careful accounting must be made to determine which pixel corresponds to which image point, for each different OPD, before the spectra can be calculated. A related problem arises because the sensor has discrete pixels: as the OPD is varied, the sensor location corresponding to a given scene location will move from being within a given pixel, to the adjacent region which lies between pixels. This causes image smear, and mixing of the spectral content of adjacent pixels. Further, it is not easy to acquire images of objects that move between successive exposures, since registration error cannot be corrected by a simple Cartesian shift.

Another type of interferometer described by Buican in U.S. Pat. No. 4,905,169 avoids many of the problems of classical interferometers. It uses a photo-elastic modulator (PEM) or equivalent device to imprint a time-varying retardance on a beam of polarized incident light, which then passes through a linear polarizer after which its intensity is measured at a photodetector. By Fourier analysis of the intensity signal, the spectral content of the incident light is determined. This instrument acts as an interferometer, based on polarization. The time-varying retardance is equivalent to an OPD between the components polarized along the ordinary and extraordinary axes of the PEM, and the analysis at the polarizer generates the equivalent of an interferogram.

Buican's instrument offers the benefits of simplicity, absence of moving parts, and ruggedness. Consequently, it can be built more economically than present-day alternatives. However, there are a few severe limitations. PEM devices provide an adequate range of OPD only when operated in resonant mode. This means that the glass or crystal element involved is excited with transducers at or near the frequency of mechanical resonance, which is typically in excess of 10 kHz, and more commonly in the range 50–80 kHz. Since the PEM undergoes an OPD excursion of up to 16 wavelengths, one would need to measure the interferogram intensity a minimum of 32 times per OPD sweep to achieve the Nyquist sampling criterion. Because the OPD is swept twice during each PEM oscillation, a total of 64 readings must be taken in 100 microseconds or less, or 1.6 microseconds per reading. This is possible with high-speed non-imaging detectors such as photodiodes or photomultiplier tubes (PMT), but not with imaging detectors like CCD or CID sensors. These sensors have much slower readout rates, since each readout involves digitizing many pixels. While very short exposure times are possible, the overall time per frame is normally 1000 microseconds or more when acquiring a continuous stream of images. This is 600× too slow to use in Buican's instrument.

Accordingly, Buican teaches that this instrument may be used in flow cytometry experiments as a non-imaging spectrometer. He further teaches in U.S. Pat. No. 5,117,466 that it is possible to combine this non-imaging instrument with optical scanning means, to obtain a two-dimensional image of a scene with spectra at each point. However, the need for scanning means subvert the inherent simplicity and ruggedness that this system offers.

Other spectral imaging systems have utilized band-sequential approaches, where an imaging detector is coupled with a spectral filter. Examples based on acousto-optic tunable filter (AOTF) elements include Lewis et. al., in U.S. Pat. No. 5,377,003, and Chao et. al. in U.S. Pat. No. 5,216,484.

Kaye teaches in U.S. Pat. No. 4,272,195 a wavelength measuring system comprising a single liquid crystal cell which is driven with a varying voltage while the incident light passes through polarizers on either side of the cell, through the cell, and onto a detector. By adjusting the drive voltage, the retardance of the cell is altered, producing a series of maxima and minima at the detector. The maxima and minima are counted to determine the wavelength of quasi-monochromatic incident light. For light with a finite bandwidth, an estimate of the bandwidth is obtained by observing the decrease in contrast at higher retardances relative to low retardance. The system is not capable of spectral analysis, nor of identifying plural wavelengths in an optical beam, as the only information available is the number of maxima and minima during an overall retardance excursion; hence only the mean-center wavelength is sensed.

Kaye teaches in U.S. Pat. No. 4,444,469 a fluorescence imaging system where a liquid crystal variable retarder is used with polarizers to selectively block a given excitation wavelength, while transmitting nearby wavelengths at which there is fluorescence emission. The retardance is stepped by integral multiples of the excitation wavelength, so that the excitation band remains blocked in all cases, while the system exhibits a variety of spectral transmission responses in the emission band. This overcomes the limitation that, for a given retardance setting, certain emission wavelengths are also extinguished, and it is said to provide an average transmission of approximately one-half for most wavelengths in the emission light. No attempt is made to utilize the variation in detected signal versus retarder setting in an effort to determine the spectral content of the fluorescent light. Kaye also teaches that a fixed retarder element such as a quartz waveplate or the like may be used in series with the liquid crystal cell. This causes the system to operate in higher order, and the spacing between transmitted and extinguished wavelengths is reduced. This enables use with fluorescent probes having a short Stokes shift.

Mercer teaches in U.S. Pat. No. 5,689,314 a point-diffraction interferometer which uses liquid crystal material to preferentially introduce a phase shift in the region surrounding a glass or plastic sphere embedded in the liquid crystal material. The sphere acts as a pinhole in this non-imaging system. Polarized light is divided into a reference beam, which passes through the glass sphere, and an object beam which passes through the liquid crystal material and which may be phase shifted by the electro-optic action of that material. The polarization axis of the incident light is parallel to the slow axis of the liquid crystal material, so a pure phase shift is produced, rather than a change in polarization state.

Satorius et. al. teaches in U.S. Pat. No. 5,838,441 an optical coherence detector which uses a fixed retarder and a variable retarder to detect coherent light in a two dimensional scene, with very wide field-of-view. The fixed retarder introduces a path delay that exceeds the coherence length of non-coherent light, but is shorter than the coherence length of the coherent light being sought. The variable retarder is cycled to adjust the overall retardance, and the resulting beam is checked for modulation, which would indicate the presence of coherent light.

Bendall teaches in U.S. Pat. No. 5,600,440 a Michelson interferometer with liquid crystal phase modulators in each arm of the interferometer. Pixilated liquid crystal elements provide a one- or two-dimensional linear array of pixels each of whose phase may be independently adjusted. The spectral resolution is shown as related to the number of distinct pixel regions in the liquid crystal cells, but the reason for this is unclear. A single-pass version uses only a single beam; an interferogram is developed by unspecified means. One embodiment of the single-beam, single-pass instrument uses a pair of adjacent sequential liquid crystal cells, driven identically, with orthogonally-oriented slow axes, to produce pure phase modulation. The reliance on a Michelson design renders the instrument thermally-sensitive, and requires fabrication of many precision optical surfaces; these concerns are in no way ameliorated through the use of liquid crystal elements.

Others, including Kaye in U.S. Pat. No. 4,394,069 and Tatsuo Uchida in Laser Focus World, May 1999, page 65, have taught the use of N liquid crystal cells and N+1 polarizers in optical series to form a Lyot filter. The thickness of the liquid crystal layers is carefully maintained in a ratio of integers or half-integers. When like voltages are applied to all cells, they express retardances which are in the same integral or half-integral ratios. By proper design using these cells sandwiched between polarizers, a Lyot filter is formed which can be easily tuned by varying the voltage that is applied to the ensemble of cells. Kaye teaches the use of this assembly as a tunable spectrometer. However, construction of an instrument with high resolution is difficult, due to mismatch between cells, thermal drift, and component tolerances. The same factors limit the wavelength accuracy of a spectrometer built on these principles.

Itoh et. al. teach in Optics Letters Volume 15(11), pp 652–654 (1990) the use of a nematic liquid crystal cell in reflection mode to act as a Fourier-transform spectrometer in an imaging system using a CCD detector. But they point out that their system suffers from strong dependence on incident angle, leading to a severely limited field-of-view, which is asymmetric and not easy to study or remove by post-processing of the interferograms. Further, the system is prone to drift and does not produce a stable OPD as the ambient temperature is varied.

Sharp et. al. teach another birefringent interferometer in SPIE Proc. 3384, Conference on Photonic Processing Technologies and Applications II, pp. 161–171 (1998). This device incorporates quartz plates or other fixed retarders which are switched using achromatic half-wave plates based on ferroelectric liquid crystal cells. While it has rapid time response and no field-of-view limitations are described, only discrete values of OPD are produced by this system, corresponding to the sum and difference values of the retarder elements involved. The discrete OPD of this system is a severe limitation since it is a benefit to be able to produce arbitrary values of OPD, or at least OPD values that are precisely even in their spacing. Achieving precisely even OPD spacing with this system would require fabrication of the fixed retarders to exacting tolerances, which is costly. The apparatus further incorporates an achromatic quarter-wave plate to digitally switch the retardation, wavelength-independently, in quarter-wave steps. Yet this does not ameliorate the problems brought on by discrete OPD steps. Further, since it produces a fixed polarization rotation (on the Poincare sphere), this element effects an OPD that is proportional to wavelength. Since it does not provide the same OPD for all wavelengths (even in the absence of dispersion), but rather provides a constant degree of polarization rotation independent of wavelength, it is not clear whether any meaningful spectral information is gained from the use of this element.

Miller teaches in U.S. Pat. No. 5,247,378 the construction of Lyot and Solc filters using liquid crystal cells in combination with fixed retarders. This provides for retardances that can be large, yet variable, from which a liquid crystal tunable filter (LCTF) of high spectral resolution can be built. The retardance of each liquid crystal cell is sensed by an electrical scheme, enabling precise tuning despite thermal drift, aging, and the like. In distinction to Kaye U.S. Pat. No. 4,394,069, different voltages are required at each stage to achieve proper tuning. The drive levels are calculated by a microprocessor, based on the properties of the fixed retarders and liquid crystal cells involved. Kaye teaches in U.S. Pat. No. 4,497,542 that two nematic liquid crystal cells of the type conventionally termed 'flat-field' cells, constructed with mirror-symmetric pre-tilt angles, may be placed in series to provide an overall retardance that is significantly freer of off-axis variation in retardance than a single flat-field cell. This benefit is especially great under partial-drive conditions.

Miller teaches in U.S. Pat. No. 4,848,877 the use of a monochromatic light beam to determine the retardance of a nematic variable retardance liquid crystal cell while it is in use, or at intervals. The beam is polarized prior to entering the liquid crystal cell, preferably at or near an axis of 45 degrees with respect to the liquid crystal director axis. It is then analyzed and its intensity is detected, from which the transmission and cell retardance are determined.

So, while interferometers, PEM-based polarization interferometers, AOTFs, LCTFs and various liquid crystal arrangements have been taught by the prior art, all have severe limitations. Those which provide for spectral imaging by interference means such as Michelson, Sagnac, or other interferometers suffer from high cost and complexity. PEM systems are not compatible with imaging detectors, and require a scanning mechanism if an image is sought. AOTFs and LCTFs have low throughput and, since they reject all light that lies outside of their passband, fail to make use of all the information in the incident beam. Coherence detectors and wavelength detectors do not provide spectral data for non-monochromatic signals. Prior-art liquid crystal interferometers do not provide a useful field-of-view, or are not thermally rugged, or do not provide continuously variable OPD. The fluorescence system of Kaye provides only for collection of fluorescence emission in the face of an excitation signal, without any means for determining the spectrum of emission light. None provides a rugged, economical, precise means for spectral imaging.

SUMMARY OF THE INVENTION

It is the aim of the present Invention to provide a simple, low-cost means for spectral imaging. It is a further aim to provide for enhanced ruggedness over mechanically-operated FTS instruments. It is yet another aim to provide this capability in a device which is smaller than any prior-art device, and preferably at least an order of magnitude smaller than any prior art device, so that it can be incorporated into microscopes, telescopes, and the like, without difficulty.

The invention consists of an apparatus and method for providing spectral information via one or more liquid crystal variable retarder cells situated between a pair of polarizers, to form a polarization interferometer that is continuously variable over a substantial range of OPD. This interferometer is used together with a detector to read overall intensity while the liquid crystal retardance is varied by known amounts. From the pattern of variation with OPD, the spectrum is obtained using Fourier transform methods.

The assembly forms an imaging spectrometer that is simple, economical, and capable of precise spectroscopic analysis. It provides nearly diffraction-limited image quality, and can be built using two-dimensional pixelated detectors such as CCD and CID sensors. This arrangement yields spectra for every point in a complex scene, using very simple equipment and conventional imaging detectors.

It is possible to incorporate fixed retarders such as quartz or calcite waveplates into the polarization interferometer, to achieve a greater range of OPD adjustment and realize higher spectral resolution. Several cells may be combined in series without significantly degrading the image quality, OPD selection, or off-axis properties. The invention preferably includes a reference beam, such as from a laser diode, to provide in-situ monitoring of the OPD.

Unlike the Sagnac interferometer of Cabib, a given sensor pixel corresponds to a single scene location, regardless of the OPD setting of the liquid crystal elements. As there are no moving parts, nor any electro-optic deflection, there is no shift in the image as the OPD is varied. Image quality is essentially diffraction-limited. Calibration of wavelength scale is straightforward and reproducible, and there is essentially no thermal drift. Similarly, the calibration of intensity (or transmission) values is direct.

At the liquid crystal cell setting corresponding to an OPD of zero, essentially all light is transmitted to the sensor, independent of wavelength. Thus, for focusing and other operations, one may image all points in the scene directly without any attenuation.

In practicing the present invention, the polarization interferometer can be placed directly adjacent the detector, for analyzing the spectral quality of luminous or fluorescent objects. Alternatively, it may be placed adjacent a lamp and used to filter the light which illuminates a scene; the scene may then be viewed with a detector using essentially conventional optics, and spectra determined for each point in the scene.

Efficiency of the present invention is approximately 80 percent, broadband. This exceeds the theoretical limit of 50% for interferometers such as Michelson or Sagnac types. Further, the instant invention, although based on polarization interference, can be constructed to utilize both polarization states of light in an incident beam. Thus, it can achieve throughputs of 80% even for unpolarized scenes. It can therefore be used in low-light settings such as fluorescence without a penalty in efficiency. It can also be used in remote sensing, medical imaging, bright-field microscopy, colorimetry, general spectroscopy, and other applications.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 3a depicts an arrangement for constructing the RAU, incorporating two cells and a compensation film for improved off-axis performance.

FIG. 3b depicts an arrangement for constructing the RAU, incorporating four cells and a compensation film for improved off-axis performance and/or greater OPD.

FIG. 3c depicts another arrangement for constructing the RAU, incorporating multiple compensation films in an alternative approach to compensating off-axis performance.

DETAILED DESCRIPTION OF THE PRESENTLY PREFERRED EMBODIMENTS

The invention is an interferometer, consisting of a liquid crystal means for adjusting optical retardance over a range of one wavelength or more, in combination with entrance and analyzer polarizers, a detector, and control electronics. If the incident light is suitably polarized, the entrance polarizer may be omitted.

The retardance produces an OPD between the optical component which is polarized along the ordinary axis of the liquid crystal material, and the component which is polarized along the extra-ordinary axis. These components are made to interfere at the analyzer polarizer, in analogy with a conventional two-beam interferometer such as a Michelson interferometer. It is worth noting, however, that since recombination is achieved without use of beamsplitters, the present invention does not suffer the 50% efficiency loss associated with conventional interferometers.

In designing an instrument according to the present invention, one must provide sufficient OPD range to achieve the desired spectral resolution. According to the conventional relationship, $$\delta\lambda = \lambda/2(OPD_{max}/\lambda) = \lambda^2/2OPD_{max} \quad [1]$$

So, the liquid crystal assembly must be constructed to achieve a suitable range of OPD. Also, it must be possible to set the OPD precisely and reproducibly, while varying it over what may be a wide range. Finally, the OPD must be uniform across the aperture and over the field-of-view of the instrument.

Figure 1:
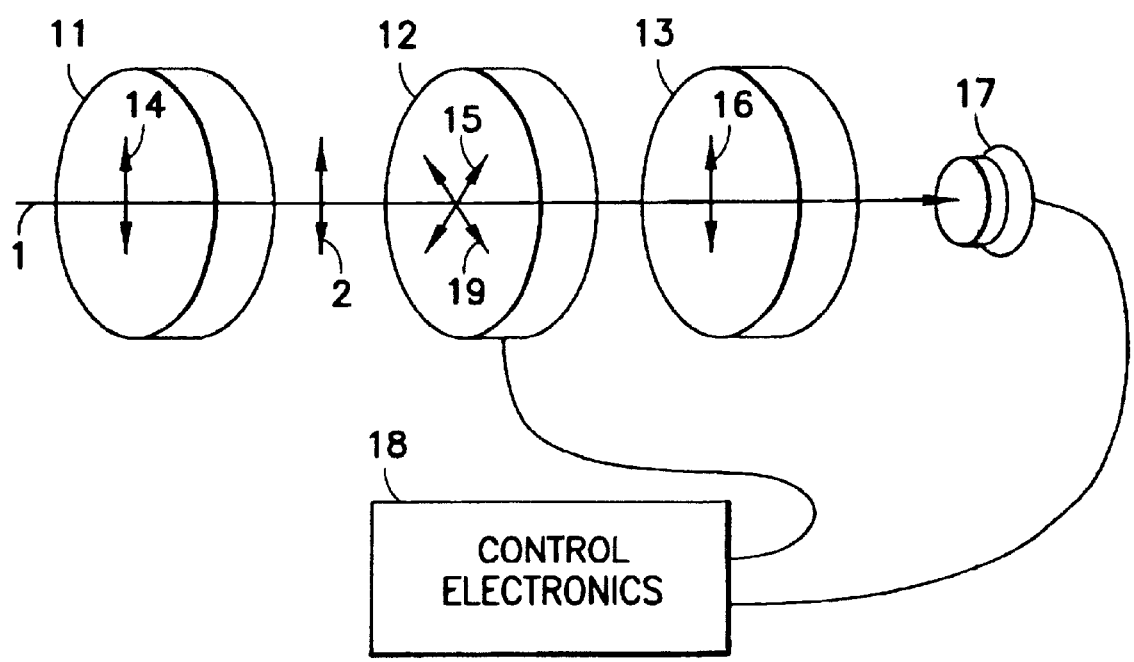
FIG. 1 depicts the invention, comprising a retardance adjustment unit (RAU) between two polarizers, a photodetector, and control circuitry which reads the photodetector signal, controls the RAU, and determines the spectrum.

The invention 10 is pictured in FIG. 1, consisting of an input polarizer 11 with transmission axis 14, a retardance adjustment unit (RAU) 12 with slow axis 15, an analyzer polarizer 13 with transmission axis 16, a detector 17, and control means 18 connected to the detector and the RAU. Preferably, the axes 14 and 16 of the two polarizers are parallel to one another, and oriented at 45 degrees to the slow axis 15 of RAU 12. Incident light 1 is polarized by polarizer 11 so it has an electric field along axis 14. It is resolved into components with electric field oriented parallel to the slow axis 15 and fast axis 19 of the RAU, and emerges from the RAU with the slow axis component retarded relative to the fast axis component by a selectable amount. This amount, which is equal to the retardance of the RAU, is effectively the OPD of the interferometer. When the beam 1 passes through the analyzer polarizer 13, the two components interfere to produce an overall intensity given by:

$$I = kI_0 \cos^2(\pi R/\lambda) = kI_0 [\cos(2\pi R/\lambda)/2 + \frac{1}{2}]. \quad [2]$$

where:

$I_0$ is the intensity of the beam 1 prior to the polarizer, k is the transmission efficiency of the polarizer, R is the retardance of the RAU, and $\lambda$ is the wavelength of light.

Since the retardance is precisely the OPD between the ordinary and extraordinary components, it is convenient to rewrite equation [2] as:

$$I = kI_0 [\cos(2\pi z/\lambda)/2 + \frac{1}{2}] \quad [3]$$

where z denotes the OPD. Equation 3 is the same equation that describes a Michelson interferometer having balanced intensity in the two optical paths.

This arrangement may be operated as an FTS with an OPD given by the retardance of the RAU element, and it produces identical interferogram data to that of an FTS instrument. It is therefore possible to use all of the prior art developed for imaging and non-imaging FTS instruments in the context of the present invention, including data acquisition, windowing, averaging, and other data analysis methods. These techniques are well-known in the art of spectral instrumentation, and are not recited here. A good introduction is available in Reinhard Beer's *Remote Sensing by Fourier Transform Spectroscopy*, Wiley-Interscience, New York (1991), but this is not meant as a limitation, since literally all techniques applicable to other FTS instruments may be used in the context of the present invention.

As just noted, the present invention may be used with the data analysis techniques of the existing art for transforming interferograms to spectral data. It is similarly appropriate to practice this invention in concert with any other software, analysis, and algorithms that are applicable with other FTS instruments, or which make use of imaging spectral information. Examples of suitable practices for use with the present invention include any known techniques for spectral analysis, including without limitation principal component analysis, linear decomposition, decorrelated spectral analylis; or image processing, including without limitation image segmentation, object recognition and counting, neural network analysis, development of morphological indices; or combinations of spectral and image analysis as are known to those familiar with the art of remote sensing, biomedical imaging, or machine vision, where these techniques are routinely employed.

It is worth explaining how the inevitable deficiencies of construction may be handled. In general, they correspond to equivalent deficiencies in the prior-art FTS instruments, and may be handled using the methods already developed for those instruments. First, the orientation of the polarizers 11 and 13 may not be perfect, nor will the RAU 12 exhibit its slow axis at the desired angle. This results in a reduced modulation depth, just as in an interferometer having unequal intensities in the two paths.

Second, the retardance R arises from the birefringence of liquid crystal material in the RAU, as described below. Accordingly, R (and z) are functions of wavelength due to the inevitable dispersion in birefringence:

$$dn(\lambda)=[n_e(\lambda)-n_o(\lambda)] \qquad [4]$$

where:
dn($\lambda$) is the birefringence as a function of wavelength
$n_e$ is the extra-ordinary index of refraction of the liquid crystal material
$n_o$ is the ordinary index of refraction of the liquid crystal material Then one may write the expression for OPD as a function of wavelength:

$$OPD(\lambda)=OPD(\lambda_0)\ [dn(\lambda)/dn(\lambda_0)] \qquad [5]$$

This is analogous to FTS instruments where the OPD is varied by introducing a material in one arm (most commonly, a pressurized chamber filled with a gas), which develops an OPD having the dispersion of the material being introduced. Again, prior art methods from FTS technology may be employed.

For an example of one way to accommodate dispersion in the OPD, notice that the OPD appears in the governing equation [3] only in the term 2 $\pi z/\lambda$. One may account for the effect of dispersion by first determining the spectrum assuming no dispersion, i.e. $z(\lambda)$ is given by $z\lambda=\lambda_0$), and then re-scaling the wavelength axis as:

$$\lambda_{rescaled}=\lambda_{raw}[dn(\lambda_0)/dn(\lambda_{rescaled})] \qquad [6]$$

That is, one performs the FTS analysis in a scaled-wavelength space, then re-scales wavelength to account for dispersion.

Third, the effect of variations of retardance across the aperture is analogous to variation in OPD produced by wavefront figuring errors in the mirrors of a Michelson interferometer, and may be considered in the same way.

Figure 2:
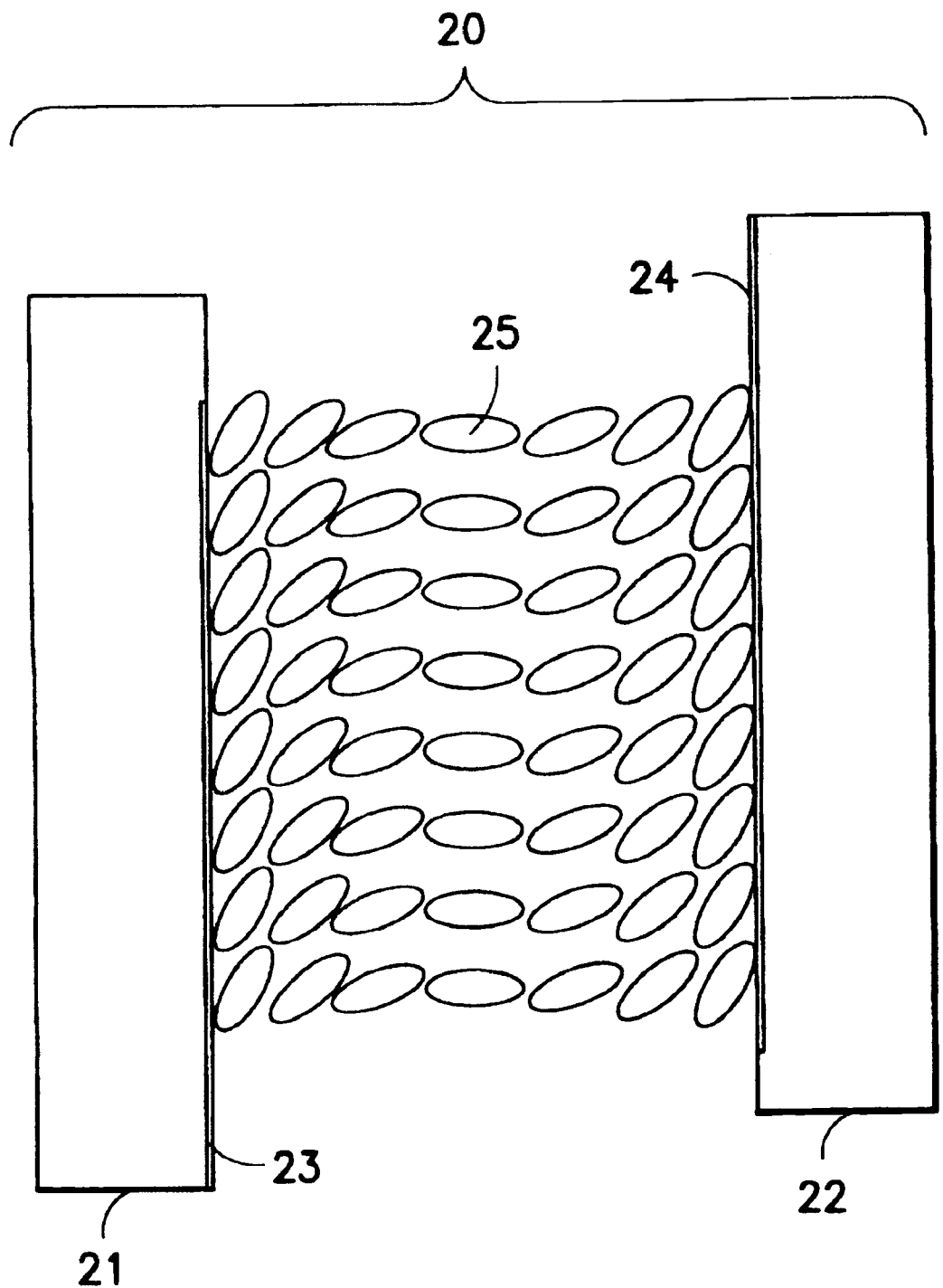
FIG. 2 depicts one arrangement for constructing the RAU, incorporating one or more variable-retardance liquid crystal cells in optical series.

Turning to the construction of the RAU, one approach is shown in FIG. 2. A single liquid crystal variable retardance cell 20 is used, which expresses a range of several wavelengths of OPD. The cell 20 can be constructed using two substrates 21 and 22 of 0.7 mm thick Corning 7059F glass, the inner surfaces of which have been coated with ITO having a sheet resistivity of 500 Ω/square by Donnelly (Holland, Mich.) to form transparent electrodes 23 and 24. The electrodes are then treated to provide a low pretilt alignment using means known in the art, such as spin-coating with polyimide and unidirectional buffing with cloth. The substrates are assembled using 13 micron glass spacers from EM Industries (Hawthorne, N.Y.), and filled with liquid crystal material 25, of type MLC-6080 (EM Industries). The resulting cell will display approximately 4 waves of retardance at 633 nm when undriven, dropping continuously for drive voltages above the threshold voltage $V_{th}$ of approximately 2.2 volts, and exhibiting approximately 90 nm retardance when driven with 24 volts. Note that this drawing is not to scale, as the relative thickness of the liquid crystal layer and conductive coatings are greatly expanded relative to the substrates to show detail.

Achieving good uniformity of the liquid crystal layer thickness across the aperture is vital. To a good approximation, $$dR/R=dX/X_0 \qquad [7]$$

where
R is the mean retardance,
$X_0$ is the mean liquid crystal thickness,
dX is the magnitude of thickness variations across the aperture, and
dR is the variation in retardance (OPD) across the aperture.

The variation across the aperture is proportional to mean retardance, independent of drive level, so a greater absolute error is seen when the cell is driven with a small voltage and expresses a greater total OPD. Conversely, the absolute error is reduced when the cell is driven with a large voltage and expresses a small OPD.

It is within the known liquid crystal art to make a cell with a spacing uniformity of less than 1 green-light fringe, or better than 200 nm physical spacing uniformity. In a cell of 13 microns' thickness, this corresponds to a variation of approximately 1.6%. Consequently, an RAU constructed according to the above design would have a figure-induced limit of 1.6% of the mean wavelength being measured. Two approaches for reducing this are to use thicker cells, or to use glass with a better flatness for the substrates. Illustrating this, one could construct a cell with 25 microns spacing, and approximately halve the variation, to 0.20/25=0.8% of the OPD. A lower-birefringence liquid crystal material may then be used, unless an increased OPD range is desired.

However, when a single flat-field cell is used, there will be a considerable range of retardance expressed for off-axis rays, particularly rays for which the plane of incidence includes the liquid crystal director axis. This is the effect noted by Itoh et. al. which led to the severe field-of-view limits of their apparatus. And, since the shape of the electro-optic curve is quite steep for voltages just above the Freedricks threshold voltage $V_{Th}$, one must have very fine control of the drive voltage in order to afford precise control of OPD near this operating point. In all, the use of a single flat-field cell as the RAU is favored only when the requirements for field-of-view and OPD range are relatively small.

The arrangement taught by Kaye (U.S. Pat. No. 4,497,542) is more suitable. It uses two cells, each with half the overall retardance, with their slow axes parallel to one another, but constructed with an opposite tilt sense. This provides an improved field-of-view. Also, since two cells are used, a higher overall retardance can be achieved and greater speed is achieved compared to a single, thicker cell.

Another suitable arrangement is the pi cell, taught by Bos et. al. in U.S. Pat. No. 4,582,396. It again affords an improved field-of-view relative to the single cell described above. However, the maximum retardance is lower, since the pi cell is meta-stable at low drive voltages, and decays to a twisted state. Typically, this decay occurs at a point where the cell expresses approximately one-third of the OPD of a flat-field cell having the same thickness and liquid crystal type. For this reason, a diminished retardance range is expressed.

When two pi cells are used in optical series, it is beneficial to provide compensation for off-axis rays. In these cells, a significant proportion of the liquid crystal molecules are oriented along the optical axis. This is because of the geometry of the cells, and because they are operated well above the threshold voltage. A pair of pi cells may be placed on either side of a half-wave plate, with the slow axes of the cells at +45° and −45° relative to the polarizer transmission axis, and the slow axis of the half-wave plate oriented at 0° or 90°. This is pictured in FIG. 3a, where the RAU incorporates a first cell 30 with its slow axis 33 oriented at 45° relative to the polarization of incident light; a half-wave plate 31 in optical series with its slow axis 34 oriented perpendicular to the polarization axis of incident light; and a second cell 32 in optical series with its slow axis 35 oriented orthogonally to the axis 33 of the first cell 30.

The half-wave plate should normally be achromatic over the wavelength range of interest. Methods and materials for the construction of this component are well-known in the art. The overall arrangement of cells and half-wave plate is analogous to the wide-field retarder elements used in Lyot filters, and described in The Birefringent Filter, J. Evans J. Opt. Soc. Am., pp. 229–42 (1949). The retardance of the cells sums, despite their axes being crossed, because of the action of the half-wave plate between them. Also, in addition to the benefits described by Evans in the context of Lyot filters, for which the crystal axes of the waveplates typically lie in the plane of the element, there is a special benefit when using liquid crystal cells: the detrimental effects of having some liquid crystal molecules oriented along the optical axis is greatly reduced. This problem has no precedent in Lyot filter construction, and is alleviated by the use of a half-wave plate with its slow axis oriented at 0° to the polarization axis 2 of light 1 incident on the first pi cell 30. Orienting its slow axis at 90° works as well.

The same approach may be used to compensate four flat-field cells, with a pair having opposed tilt angles being placed on each side of the half-wave plate. These cells have the same problem of z-aligned material (along the optical axes), but for a given working OPD they exhibit a lesser degree than the corresponding pi cell would. This is pictured in FIG. 3b. Cells 30 and 36 have slow axes 33 and 38 which are co-planar, although the cells have opposing pre-tilt to improve their field-of-view, in accordance with the teaching of Kaye discussed above. The difference in pre-tilt sense is indicated by the direction of the arrowheads in this Figure. Their slow axes are at substantially 45° to the polarization axis 2 of incident light 1. Half-wave plate 31 has its slow axis 34 oriented at substantially 0° or 90° to the polarization axis 2. Finally, cells 32 and 37 have coplanar slow axes 35 and 39 that are oriented orthogonal to axes 33 and 38 of first cells 30 and 36.

Alternatively, the effect of z-aligned liquid crystal material can be compensated using other techniques developed in the display industry. For example, one may make use of discotic film manufactured by Fuji for use in flat-panel displays. It may be placed on one or both sides of a cell to reduce the effect of z-axis material, as shown in FIG. 3c. This shows cells 30 and 36 with axes 33 and 38 that are co-planar, and oriented at an angle of approximately 45° to the polarization axis 2 of the incident light 1.

These techniques and others developed for use in the display industry may be used for the purpose of producing a retardance which is variable with voltage, but which has little variation with viewing angle. The techniques may be used in combination or separately, according to normal engineering practices.

When using the above methods one is limited to the range of OPD that can be expressed by a series of liquid crystal cells. Since each cell has a spatial variation of OPD across its aperture, and in production these variations may be additive (depending on the exact spatial patterns involved), there is a limit to the number of cells which can be placed in series before the variation in OPD across the RAU assembly is too great. Other factors, such as optical losses, complexity, scatter, and the like, impose similar limits on the use of large numbers of plural cells.

Figure 4:
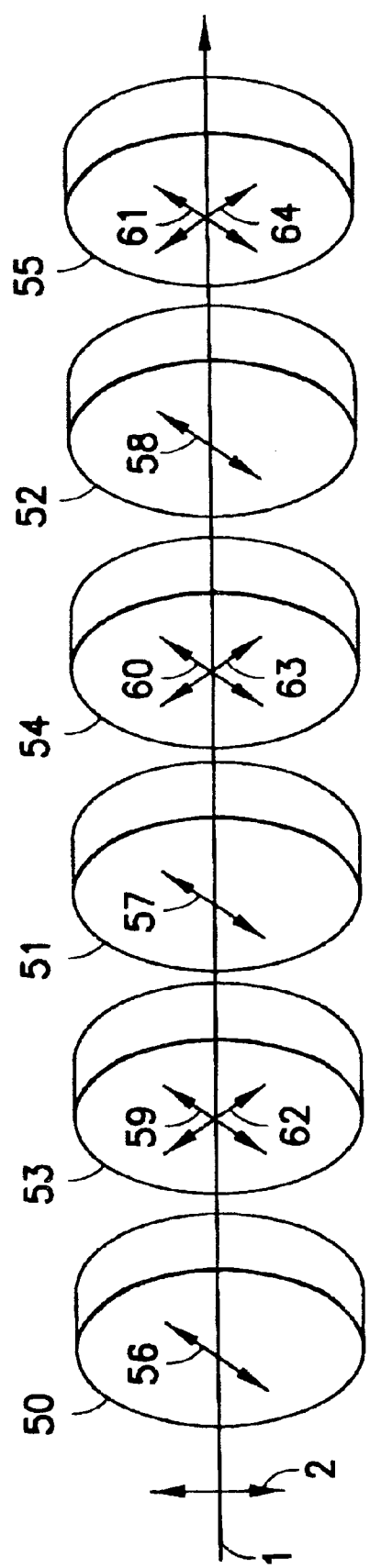
FIG. 4 depicts a particular arrangement for incorporating fixed retarders in the RAU, using twisted-nematic cells to switch the sense of the retarders between additive and subtractive with the liquid crystal variable-retardance cells.

Another approach to constructing an RAU is shown in FIG. 4, which permits operation at high OPD without correspondingly tight tolerances on the liquid crystal cells. It includes quartz retarder elements 50 and 51 having slow axes 56 and 57. Retarder 50 has a retardance of R and retarder 51 has a retardance of 2R. Following these in optical series is a variable-retardance liquid crystal cell or cells 52 having an effective slow axis 58 and a retardance range [0, R]. The slow axes of all these elements are oriented at substantially 45° to the transmission axis 2 of incident light 1. Liquid crystal switches 53 and 54 are placed between quartz retarders 50 and 51, and between quartz retarder 51 and liquid crystal retarder 52, respectively. The switches are pictured as twisted-nematic cells with 90° twist, whose director orientations at the entrance faces are given by 59 and 60, and whose director orientations at the exit faces are given by 62 and 63. These are parallel and perpendicular, respectively, to the slow axes of the quartz and liquid crystal retarders. A final liquid crystal switch 55 has the same arrangement of its entrance and exit face directors 61 and 64 as in cells 53 and 54.

This provides means for switching the action of retarders 51 and 52 from being additive with the first quartz retarder 50, to being subtractive from it. Typically, the fixed quartz retarders in this type of RAU are chosen to have a binary geometric series of retardances, such as R:2R, etc., and the liquid crystal retarder is adjustable over a range of at least [0, R]. Then, by proper switch settings, one may obtain any value of retardance from 0 to 4R. The scheme may be extended with additional fixed retarders to achieve an overall retardance of $2^{N+1}R$, where N is the number of fixed retarders. In this way, high OPD and high spectral resolution are realized. Other retarder value choices may be employed as well, provided that they enable spanning the desired range of overall retardance, or OPD.

The operation of this assembly is worth describing in some detail. In this discussion, we make use of the common approximation that an undriven twisted-nematic cell with twist angle of β introduces a co-ordinate transformation that is a rotation by β; and that it introduces a retardation (or OPD) between the component of light introduced along the cell's slow axis and that introduced along the fast axis of:

$$R_{switch} = \delta n D / \lambda \qquad [8]$$

where
 δn is the birefringence of the liquid crystal mixture,
 D is the cell spacing, and
 λ is the wavelength of light.

Effectively $R_{switch}$ is the retardance between the two eigenmodes of the twisted nematic cell.

In the highly driven state, it is a common approximation that the cell has no optical action. In reality, the cell's operation is more complex than this, and it may be modeled using the known art methods, such as to consider the cell as a series of birefringent slabs having different axis orientations from one slab to the next. These and other more sophisticated analyses are worth considering in an engineering effort to determine the quality of switch action. In designing a practical system, these effects will guide the choice of materials, thicknesses, and the like. However, to understand the basic switch action, one may simply consider the simplified model which incorporates the effects of co-ordinate transformation and retardation between the principal axes of the cell.

If all the switch cells are driven, the switches are optically inactive and may be ignored. Thus, the slow axes 56 and 57 of the fixed retarders 50 and 51 are effectively parallel with the slow axis 58 of variable retarder cell 52, and all their retardances add. In this way, one may generate OPD values ranging from 3R to 4R, with continuous adjustment possible by variation of the voltage applied to cell 52.

Next, consider what happens if switch cells 54 and cell 55 are undriven. Switch cell 54 adds its own retardation of $R_{switch}=\delta nD/\lambda$ and then rotates the coordinate system 90°. This causes variable retarder 52 to have an opposite sense from that of retarders 50 and 51. Its retardance is now subtractive, yielding a retardance (prior to passage through switch 55) of $$R=R_{50}+R_{51}+R_{switch}-R_{52}. \quad [9]$$

Now consider the effect of passage through switch 55 in the undriven state. Provided that the twisted-nematic switches have matched construction, the retardation $R_{switch}$ of switch 55 equals that of switch 54, but its retardance is subtractive, not additive, because it is situated after the 90° coordinate transformation. So, those components which passed through the slow axis of switch 54 will pass through the fast axis of switch 55 and vice versa, and the retardances $R_{switch}$ of switches 54 and 55 cancel. Switch 55 introduces its own coordinate transformation of 90° rotation, which makes for a total transformation of 180°, which is indistinguishable from the untransformed state. So, undriven switch 55 corrects for both the coordinate transformation and the retardance introduced by undriven switch 54. The overall result of switches 54 and 55 being undriven is to switch variable retarder 52 from an additive to a subtractive sense. As OPD of variable retarder 52 is varied from 0 to R, the overall OPD varies from 3R to 2R.

In general, there will be an even number of optically-rotating switches in the RAU. If one adopts the convention that OPD is defined as the optical path length along axis +45° to the incident polarization vector, the overall retardance will be given by:

$$OPD=R_0+SW_1R_1+SW_1SW_2R_2\ldots+SW_1SW_2\ldots SW_NR_N \quad [10]$$

where:

$SW_i=+1/-1$ as the i-th twisted switch is nonrotating/rotating $R_i$ is the retardance of the i-th retarder in the assembly.

Put into tabular form, the RAU of FIG. 4 may be operated as follows:

TABLE 1

| Retarder 50 OPD setting | Switch 53 Setting | Switch 54 Setting | Switch 55 Setting | Overall OPD value |
|---|---|---|---|---|
| [R-0] | 90° | 0° | 90° | [0-R] |
| [0-R] | 90° | 90° | 0° | [R-2R] |
| [R-0] | 0° | 90° | 90° | [2R-3R] |
| [0-R] | 0° | 0° | 0° | [3R-4R] |

This scheme is quite general, and can be practiced with any desired number of retarders. It is not necessary that the slow axes of the retarders be parallel with one another. If one or more retarders has its fast and slow axes interchanged relative to the above example, it merely changes the sense of that retarder from additive to subtractive, and one must adjust the switch settings accordingly as will be obvious to one skilled in the art of polarized light optics. Other materials than quartz may be employed as desired, such as polycarbonate films, mica, calcite, liquid crystal polymer films, and the like. Nor is there any restriction that only a single retarder in the assembly be variable; the same principles can be used in an RAU incorporating two or more liquid crystal variable retarders. It is best to match the dispersion between the liquid crystal material and the fixed retarder material(s) employed, over the wavelength range of operation.

Other switches may be used instead of twisted-nematic type. For example, half-wave plates may be used as a suitable switch. These could be used in several ways, such as having a fixed retardance of $\lambda/2$ and a slow axis orientation that is selectable between 0° or ±−45°, or 90° and ±/−45°; or having a fixed slow axis orientation of 0° or 90° and a variable effective retardance that is selectable between 0 and $\lambda/2$. In some arrangements (such as a $\lambda/2$ plate having a switchable slow axis between 0° and 45°), the switch introduces a retardance which must be accounted for in calculating the OPD. Use of achromatic half-wave plate designs is favored, as in the prior art apparatus of Sharp et. al. These operate by a different switch mechanism, but produce the same overall effect of switching the various retarders' interaction from being additive in retardance to being subtractive.

Figure 5:
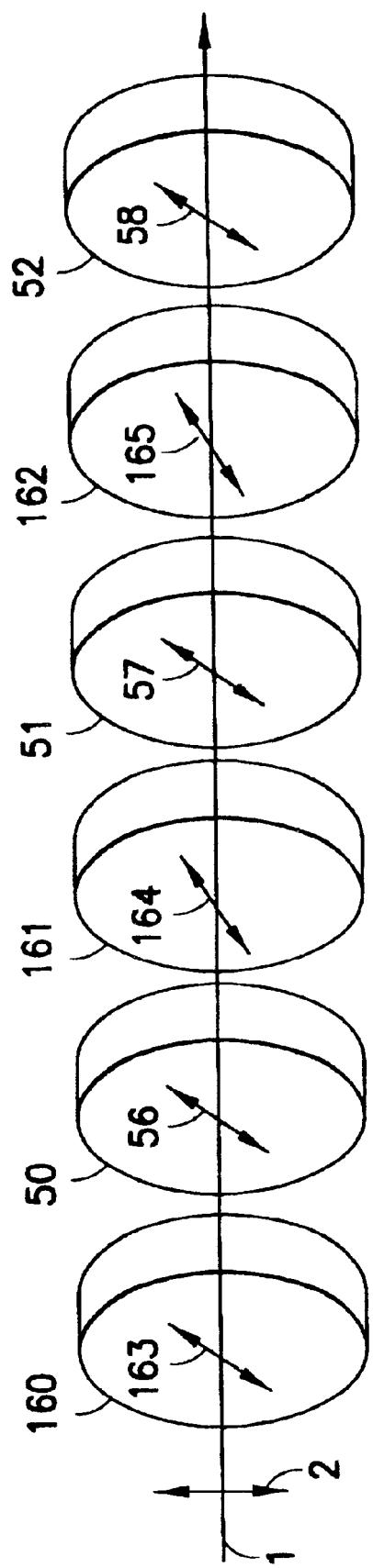
FIG. 5 depicts another arrangement for constructing the RAU with variable-retardance liquid crystal cells and fixed retarder elements such as quartz waveplates, using variable-retardance switching means.

Any switch which performs this function may be employed to form an RAU. For example, a mechanical switch could be used to engage and disengage the fixed retarder elements, or to rotate their axes to an optically-inactive position. Nematic liquid crystal cells, ferroelectric liquid crystal cells, or other electro-optic switch materials may be employed, according to the switching speed requirement, wavelength range, and other factors. All that matters is that the elements' retardance be switched into or out of the beam. For example, the RAU of FIG. 5 uses fixed retarders 50 and 51, and liquid crystal variable retarder 52 as in the previous figure, but with different switching means. Switchable half-wave plates 160, 161, and 162 having slow axes 163, 164, and 165 oriented at 22.5° relative to the polarization vector 2 of incident light 1, are located before fixed retarder 50, between retarders 50 and 51, and immediately after retarder 51.

In this example, the switchable half-wave plates have a fixed slow axis, and a retardance which is selectable between approximately 0 and approximately $\lambda/2$. If all the switches express 0 retardance, they are optically inactive and the retardances of elements 50, 51, and 52 sum algebraically. Now consider when switches 160 and 161 both express $\lambda/2$ retardance and switch 162 expresses 0. Incident light polarized at 0° is reflected to an orientation of 45° by switch 160;

it passes through retarder 50 entirely along its slow axis 56 and no OPD is developed. It then exits retarder 50 with an orientation of 45° and is reflected by switch 61 to an orientation of 0°. Retarder 50 is effectively removed from the system by these switches and may be said to be optically absent. Similarly, when switches 160 and 162 express λ/2 and switch 161 expresses 0, both retarders 50 and 51 are optically absent; or, when 161 and 162 express λ/2 and 160 expresses 0, retarder 51 is optically absent. Variable retarder 52 always exhibits its OPD. In this way, any desired retardance in the range [0–4R] may be developed.

For this arrangement, the table of switch settings and OPD values is:

TABLE 2

| Retarder 52 OPD setting | Switch 160 Setting | Switch 161 Setting | Switch 162 Setting | Overall OPD value |
|---|---|---|---|---|
| [0-R] | λ/2 | 0 | λ/2 | [0-R] |
| [0-R] | λ/2 | λ/2 | 0 | [R-2R] |
| [0-R] | 0 | λ/2 | λ/2 | [2R-3R] |
| [0-R] | 0 | 0 | 0 | [3R-4R] |

This scheme may be similarly generalized to use with various numbers of fixed retarders having various thicknesses, and various means may be employed for switching. For example, there are achromatic half-wave switches and rotators, as well as arrangements using plural cells, fixed compensator or waveplate elements, and combinations thereof, which are familiar to those skilled in the arts of polarization switching and of liquid crystal displays. These may be used in place of the switches described above, provided that the effect is to switch in or out the OPD of the fixed retarders, and that any side-effects (such as an OPD shift or coordinate transformation introduced by the switches themselves) can be cancelled by other elements, or corrected for in the overall operation of the interferometer.

In any RAU, it is of chief concern that the retardance, or OPD, be well-known in order that accurate interferograms be obtained. This can be achieved using dead-reckoning, where the properties of the liquid crystal elements are well-known by prior calibration, or by means of a non-optical in-situ measurement, such as the capacitance monitoring method described in Miller's U.S. Pat. No. 5,247,378.

Figure 6:
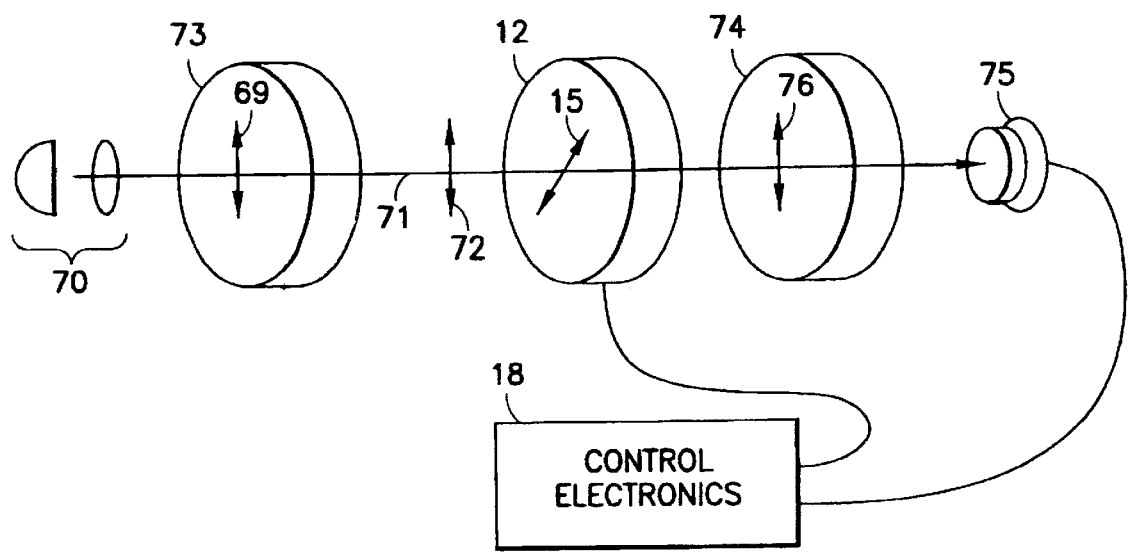
FIG. 6 depicts the RAU of the current invention, incorporating means for in-situ monitoring of the OPD.

Often, however, a more accurate measure is obtained by direct optical monitoring as shown in FIG. 6. Light from a substantially monochromatic reference source 70 forms a beam 71 that is polarized along an axis 72 and passes through RAU 12. This polarization may be intrinsic to the source, or it may be produced by polarizer element 73 with polarization axis 69 if the source 70 is unpolarized. After exiting the RAU, beam 71 passes through an analyzer polarizer 74 and lands on a photodetector 75, where its intensity is read by control means 18. The transmission axis 76 of the analyzer polarizer is either parallel or perpendicular to the polarization axis 72, and is normally 45° to the slow axis of the RAU. By observing the intensity at photodetector 75 while the RAU is swept through a range of OPD values, the exact OPD is determined by the relationship:

$$I(\lambda, R) = I_0 \cos^2 (\pi R/\lambda) \quad [11a]$$

or $$I(\lambda, R) = I_0 \sin^2 (\pi R/\lambda) \quad [11b]$$

where λ is the wavelength of reference beam 71, R is the OPD expressed by the RAU, and $I_0$ is the intensity at an OPD of 0 (equation 11a) or λ/2 (equation 11b). Equation 11a is used when the transmission axis 76 of the analyzer is parallel to polarization axis 72, and 11b is used when axis 65 is substantially perpendicular to polarization axis 72.

In practice, there will be errors introduced by imperfect optical construction, stray light, and electronic components which introduce a DC offset to the reading of I(λ, R). These can be dealt with by methods familiar to those skilled in the art of opto-electronic instrumentation, such as noting the maximum and minimum values of I(λ, R) and scaling equations 11a and 11b accordingly.

The result of the measurements and analysis of the reference beam 71 is a table of the RAU's electro-optic response for various applied voltages and switch configurations. This is used to determine the required drive conditions in order to produce a desired OPD in subsequent measurements.

It may be practical to use the detector 17 as detector 75, or polarizer 13 as polarizer 74, if this simplifies the design and makes for a more economical system. The beam 71 can be introduced through the main aperture, in time-alternation with the sample beam 1, by mechanically translating it into and out of the beam. Or, a separate but representative region of the RAU may be dedicated to the reference beam 71. It may be necessary to provide a shutter means to close off the sample beam 1 during the measurement of the RAU characteristics, if beam 1 interferes with measurements of the reference beam. To minimize interference between these beams, it may be beneficial to reverse the direction of beam 71 and relocate elements 74 and 75 accordingly, so that beam 71 passes through the RAU in reverse direction from the main beam 1. When detector 17 is distinct from 75 (or they comprise different spatial regions of the same detector), it may be desirable to use a wavelength λ for the reference beam for which the sample detector 17 is not photoresponsive. Also, one may elect to use a spectral filter at detector 75 that preferentially transmits the monitor beam wavelength λ while not having high transmission at other wavelengths. This reduces the sensitivity to ambient light, and to crosstalk from the sample beam.

Figure 7:
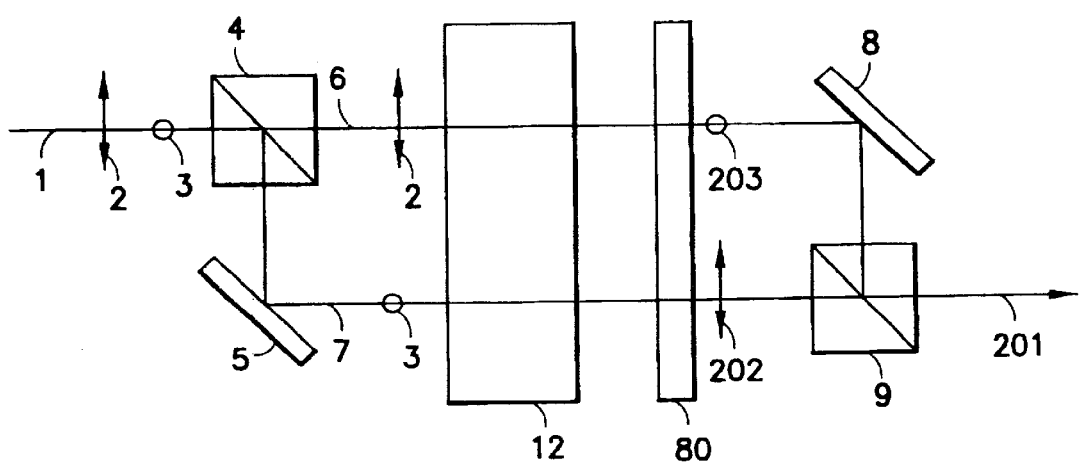
FIG. 7 depicts the RAU, incorporating polarizing beam-splitters and prisms to utilize both polarizations of incident light.

It is possible to utilize both polarizations of the incident light 1 as shown in FIG. 7. This provides for a near-doubling of the optical efficiency of the invention, since light of all polarization states contributes to the signal at detector 17. Overall efficiency becomes 100% in the ideal case, although in practice losses in the polarizers and liquid crystal cells imposes an upper limit of approximately 80 to 90%. This is to be compared with a theoretical efficiency limit of 50% for two-beam interferometers such as the Michelson, Sagnac, or similar types, that recombine the beams at a 50/50 beamsplitter.

Incident beam 1 contains polarization states 2 and 3, which are separated into the RAU 12 by means of a reflector 5. After passing through the RAU, beam 6 reflects off of a reflector 8 and joins beam 7 at a polarizing beamsplitter 9. The result is that the two beams 6 and 7 corresponding to orthogonal polarization states present in the incident beam are processed in adjacent areas of the RAU, and then recombined without loss.

Typically, polarizing beamsplitters 4 and 9 transmit light having a polarization axis that is coplanar with the normal to the hypotenuse plane of the beamsplitter, and reflect the orthogonal polarization state. This means that the overall assembly in FIG. 7 acts to rotate the polarization state of incident beam 1, and the interference at an OPD of R=0 will be destructive, not constructive. The interferograms will therefore have complementary intensity to those of a conventional FTS instrument. To remedy this, one may insert a half-wave plate immediately after the RAU, as indicated by element 80. Its slow axis 81 is oriented at ±−45° relative to the polarization axis 2 of beam 6. This changes the polarization state of beams 6 and 7 by 90° before they encounter PBS 9, so the interferograms have the normal intensity patterns, rather than being complementary. It is wise to use an achromatic half-wave plate for element 80 if the incident beam 1 has a significant range of wavelengths. Element 80 may alternatively be placed on the entrance face of RAU 12 without altering its function.

The two beams exiting the instrument of FIG. 7 will have some inevitable degree of misalignment, arising from the construction tolerances of the PBS elements and the like. At least one of the mirrors may be made adjustable so that the beams can be registered perfectly. Devices constructed along this design have shown registration errors of less than one pixel across an image of 1030×1300 pixels.

Figure 8:
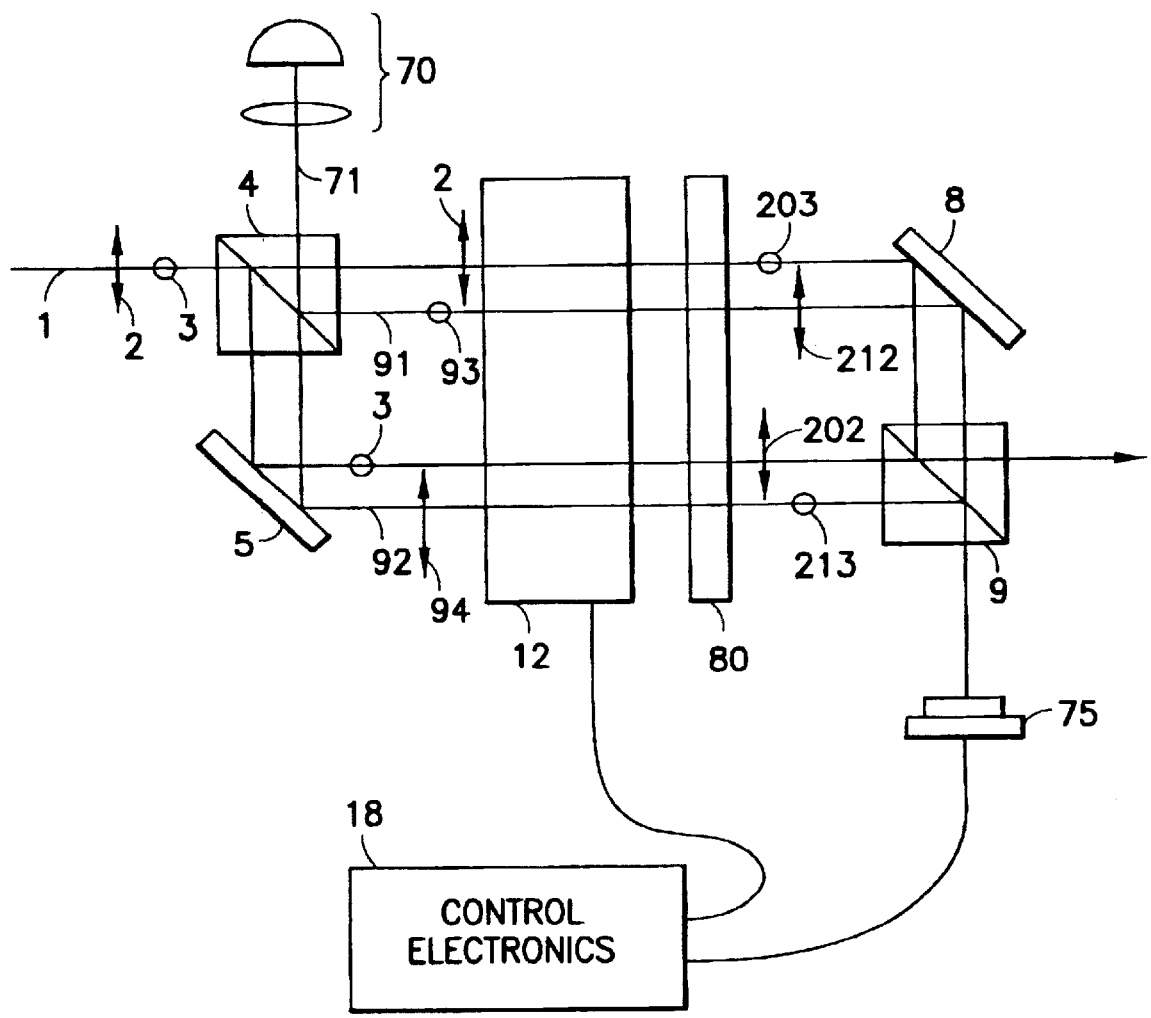
FIG. 8 depicts the RAU constructed to utilize both polarizations of incident light, along with means for in-situ monitoring of the OPD.

Another benefit of this arrangement is shown in FIG. 8, which shows the incorporation of a reference beam 71 for optical monitoring of RAU by means of the PBS elements. Reference beam is introduced at the side face of PBS 4, where it is split into beams 91 and 92 having polarization axes 93 and 94, respectively. Beam 91 passes directly to the RAU 12 while beam 92 reflects off mirror 5 and then passes to the RAU 12. After leaving the RAU, the polarization state of beams 91 and 92 are transformed to the orthogonal state by achromatic half-wave plate 80, and then pass to PBS 9 (by way of mirror 8, in the case of beam 91). Photodetector 75 measures the intensity of the resulting beam and communicates it to control electronics 18.

By studying the polarization orientation vectors involved, it is apparent that the overall arrangement is equivalent to monitoring the RAU through parallel polarizers, so equation 11a is appropriate. If achromatic half-wave plate 80 is omitted, the complementary signal is obtained, and equation 11b is appropriate.

It is possible to re-arrange the components 75 and 70 so the reference beam passes through the RAU, PBS elements, and mirrors in the opposite direction. This can reduce the cross-talk between sample beam 1 and the reference beam 71.

Figure 9A:
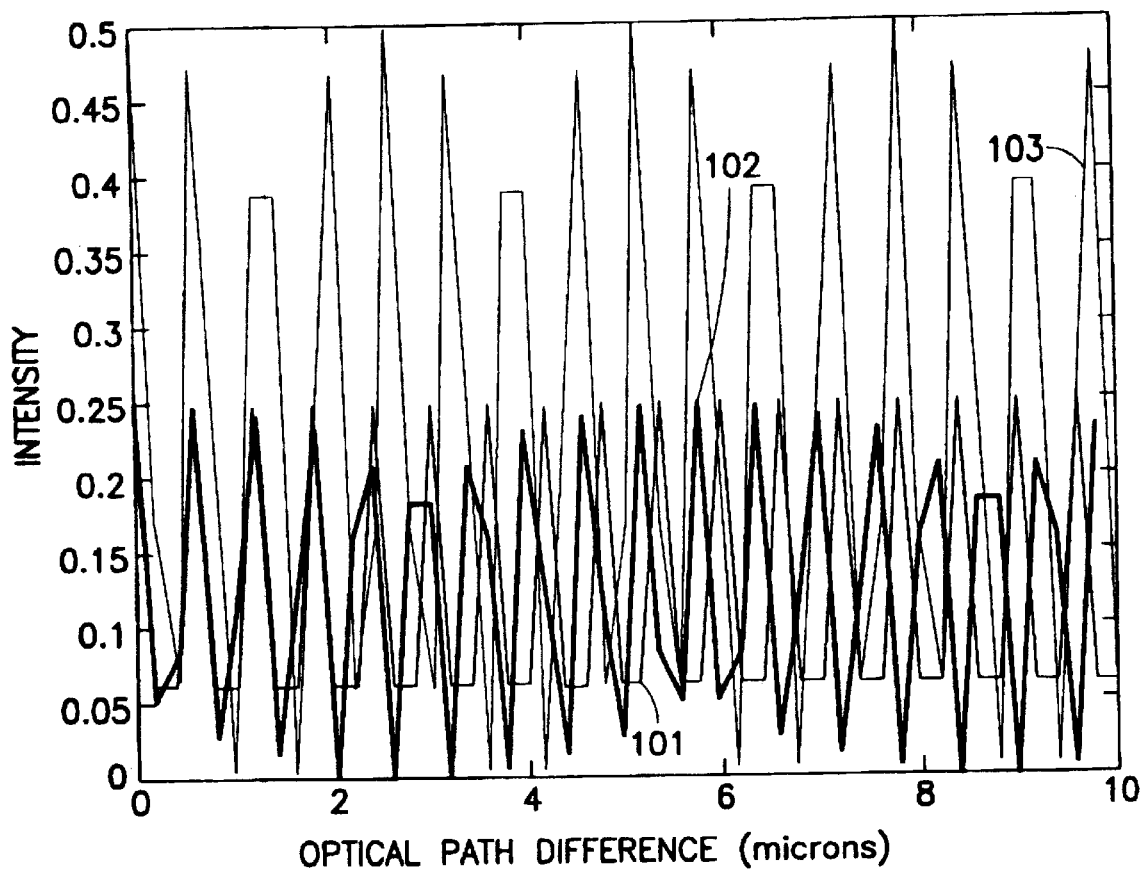
FIG. 9a depicts the signal at the detector as the OPD is varied, for several different types of incident light, each monochromatic but having different wavelengths from one another.

The intensity incident upon a single pixel of detector 17 is shown as a function of OPD for monochromatic light of various wavelengths and intensities in FIG. 9a. Light of wavelength 600 nm and intensity 0.25 arbitrary units produces a response shown as 101, light of 580 nm and like intensity produces a response shown as 102, and light of 650 nm and intensity 0.50 arbitrary units produces a response shown as 103. Note that signals 101 and 102 are exactly out-of-phase at an OPD of 8.7$\mu$. Each signal produces a response in accord with equation [1].

Figure 9B:
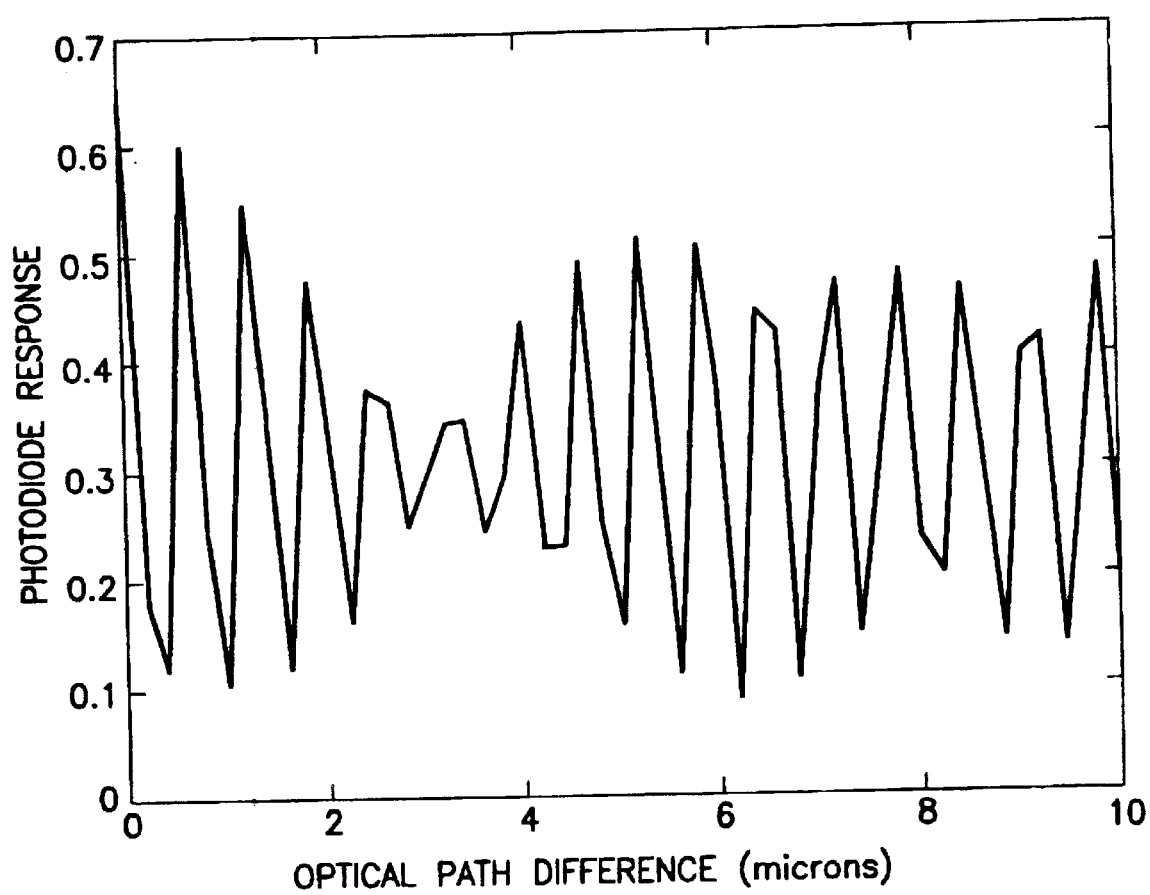
FIG. 9b depicts the signal at the detector as the OPD is varied, for incident light consisting of several wavelengths at once.

These signals produce an electrical response which is a function of the spectral responsivity of the detector 17 at each component wavelength, and of the intensity patterns of each component, as shown in FIG. 9a. A silicon photodiode will exhibit a response as shown in FIG. 9b. For these devices, the quantum efficiency is nearly constant in the visible region, so for a given intensity the photocurrent is approximately proportional to wavelength for signals.

In use as an imaging FTS instrument, an interferogram is developed at each pixel which indicates the spectral emission corresponding to a given point in the object being imaged. For each pixel, the interferogram readings must be transformed to a spectrum to yield spectral data. This process being identical for each pixel, we will discuss it only in the context of a single-pixel system. However, it will be performed for a great number of pixels when an imaging instrument is contructed. This places great value on achieving computational efficiency, in terms of minimizing the memory requirements, instruction cycles, and so forth that are required. At the same time, the massively parallel nature of the calculation enables the use of hardware and software that are optimized for highly parallel operations.

Figure 10:
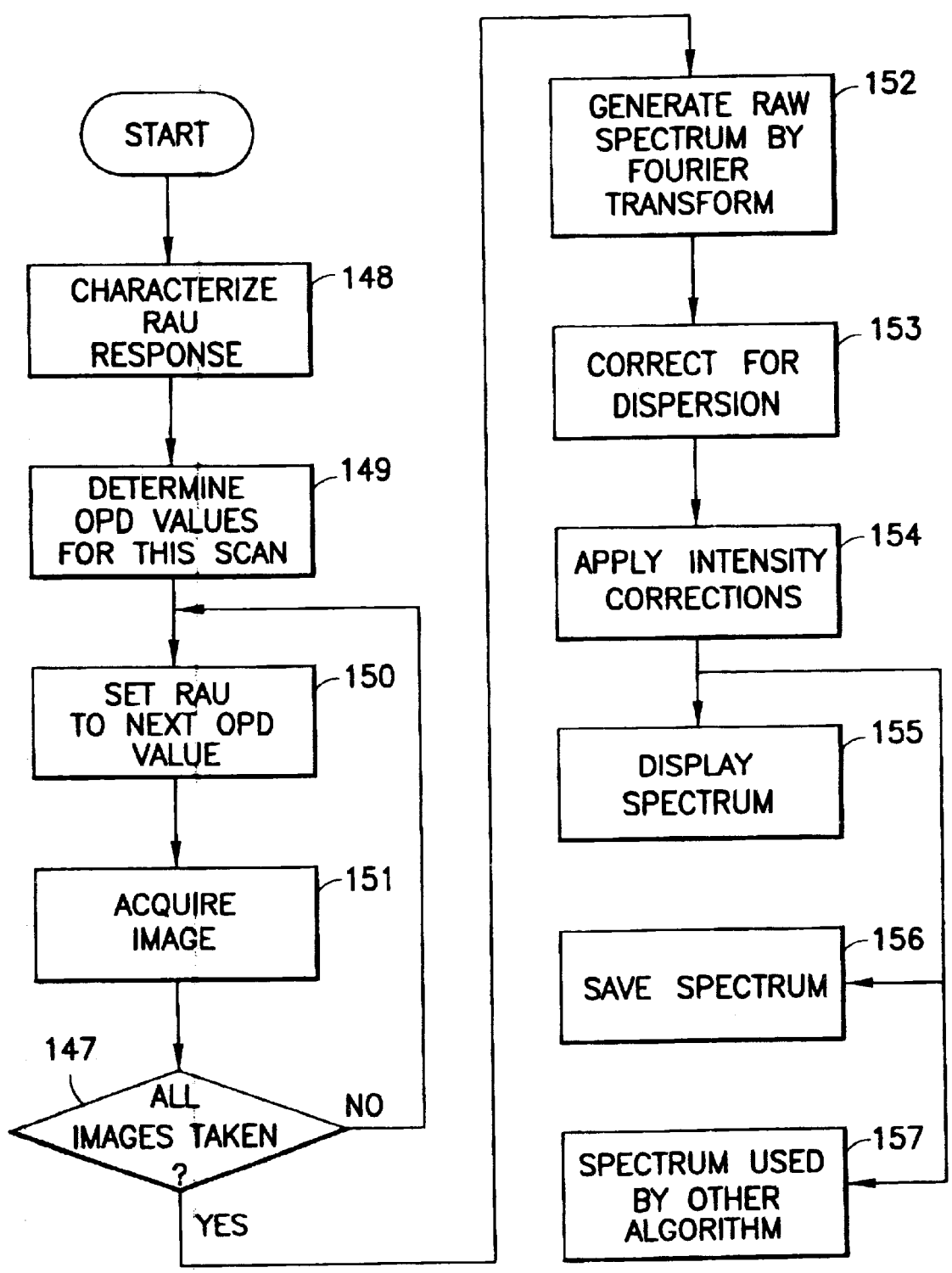
FIG. 10 depicts the method for calculating the spectrum of incident light using the present invention.

The fundamental sequence for instrumental operation is outlined in FIG. 10 for a single pixel. Detector readings are taken while the RAU is stepped through a sequence of OPD values. Typically, the OPD step size will first be chosen in step 100 based on some knowledge of the spectral content of the scene, and will be selected to be small enough to avoid aliasing in accordance with the condition:

$$\delta z/(1/\lambda_{short}-1/\lambda_{long})<0.50 \quad [12]$$

where $\delta z$ is the OPD step, and $\lambda_{short}$ and $\lambda_{long}$ are the shortest and longest wavelengths which may be present in the incident beam 1. The readings are taken in step 101 over the range [0, $Z_{max}$], where $$Z_{max}=\lambda^2/2\delta\lambda \quad [13]$$

and $\delta\lambda$ is the spectral resolution obtained at a wavelength of $\lambda$. The resulting readings are analyzed in step 152 according to the inverse Fourier transform, to yield a raw spectrum $S(\lambda_{raw})$. This in turn is corrected for dispersion in step 153 using the methods described above, or some other method, to yield a spectrum $S(\lambda_{true})$. Often, this consists simply of determining the ordinate for the spectra, which is characteristic of the OPD step and excursion, and of the dispersion of the RAU. The same ordinate applies to all spectra obtained under these conditions, such as all pixels within an image or the like. The spectral responsivity of the detector and the instrument are then corrected for in step 154, to yield a spectrum $I(\lambda_{true})$ with readings that are expressed in units of either relative or absolute intensity. The spectrum may then be displayed as in step 155, or saved for later use as in step 156, or used as an input to other calculations as in step 157.

As noted above, there are many techniques from the field of FTS analysis, and in general they may be employed in the operation of the present invention. Of particular importance are techniques for windowing, for spectral calibration, and for dispersion correction.

The methods described above for the construction of the RAU and the overall invention can be combined with the general art of optical design, interferometry, and polarization control to achieve the purposes of the present invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A birefringent interferometer for Fourier Transform spectroscopy, said birefringent interferometer being responsive to incident light, comprising:
   a variable retarder element which imparts to that component of the incident light having a first state of polarization, a continuously adjustable optical path delay relative to that component of incident light having an orthogonal state of polarization, wherein the variable retarder element is substantially free from variation in retardance over the optical field of view, and wherein the optical path delay is continuously adjustable from zero to multiple wavelengths;
   a polarizer arranged to analyze the optical path delay between the two orthogonally polarized components of light, by causing the two components to interfere;
   a photodetector responsive to the interfered light; and
   a computer in communication with the variable retarder and the photodetector which determines spectral properties of the incident light based on the photodetector signal at various values of optical path delay.

2. The birefringent interferometer of claim 1, wherein the variable retarder is a nematic liquid crystal pi cell.

3. The birefringent inteferometer of claim 1, wherein the variable retarder comprises a plurality of nematic variable retarder liquid crystal cells in optical series.

4. The birefringent interferometer of claim 3, wherein the plurality of nematic variable retarder liquid crystal cells comprise:
   two flat-field variable retardance liquid crystal cells in immediate succession, each having an opposite sense of tilt to the other.

5. The birefringent interferometer of claim 3, further comprising optical compensation films for improving the field of view.

6. The birefringent interferometer of claim 3, further comprising:
   a half-wave plate between two successive liquid crystal cells of the plurality of nematic variable retarder liquid crystal cells, said half-wave plate oriented with its slow axis parallel to the polarization axis of one of the two states of polarization.

7. The birefringent interferometer of claim 1, further comprising a retardance sensor that measures the optical path delay produced by the variable retarder element.

8. The birefringent interferometer of claim 7, wherein the variable retarder element comprises at least one nematic liquid crystal cell and the retardance sensor comprises an electrical measurement of the capacitance of the liquid crystal cell.

9. The birefringence interferometer of claim 7, wherein the retardance sensor comprises a source of monochromatic polarized light which is directed through the variable retarder element, and a photodetector which senses the variably retarded light.

10. The birefringent interferometer of claim 1, further comprising:
    polarization-sensitive optical elements for substantially increasing an optical efficiency of the interferometer by separating orthogonally polarized components of the incident light before the incident light enters the variable retarder element and rejoining the orthogonally polarized components before they enter the photodetector.

11. The birefringent interferometer of claim 10, wherein the polarization-sensitive optical elements comprise:
    a first polarizing beamsplitter for splitting the incident light into a first and second orthogonally polarized components, wherein the first component is directed towards the variable retarder element;
    a first mirror for reflecting the second component into the variable retarder element; and
    a second mirror for reflecting the first component after it exits the variable retarder element; and
    wherein the polarizer comprises a second polarizing beamsplitter for receiving the second component after it exits the variable retarder element and the first component from the second mirror.

12. The birefringent interferometer of claim 11, further comprising a half-wave retarder, adjacent to one of the entrance and exit faces of the variable retarder element, which transforms the state of polarization of light passing through it to the complementary state of polarization.

13. The birefringent interferometer of claim 10, further comprising a retardance sensor that measures the optical path delay produced by the variable retarder element.

14. The birefringent interferometer of claim 13, wherein the retardance sensor comprises an optical source providing a beam of monochromatic light disposed to pass through the variable retarder element.

15. The birefringent interferometer of claim 14, wherein the polarization sensitive elements comprise at least one polarizing beamsplitter and wherein the beam of monochromatic light reflects off the hypotenuse face of the at least one polarizing beamsplitter.

16. The birefringent interferometer of claim 15, further comprising a second polarizing beamsplitter located on the opposide side of the variable retarder element from the first polarizing beamsplitter, and a photodetector disposed to receive light which reflects from the hypotenuse face of the second polarizing beamsplitter.

17. The birefringent interferometer of claim 15, further comprising a second polarizing beamsplitter located on the opposide side of the variable retarder element from the first polarizing beamsplitter, and a photodetector disposed to receive light which is transmitted through the second polarizing beamsplitter.

18. The birefringent interferometer of claim 1, further comprising:
    a fixed retarder element; and
    an optical switch that changes retardance so as to add or subtract from an optical path delay produced by said fixed retarder element and said optical switch.

19. The birefringent interferometer of claim 18, wherein the switch is a nematic liquid crystal cell.

20. The birefringent interferometer of claim 19, wherein the switch is a twisted nematic liquid crystal cell.

21. The birefringent interferometer of claim 20, comprising a plurality of N fixed retarders and N+1 twisted nematic cells.

22. The birefringent interferometer of claim 21, wherein the N fixed retarders have a substantially binary sequence of retardances.

23. The birefringent interferometer of claim 18, comprising N fixed retarders and N+1 optical switches that switch the state of polarization of light passing through them by 45 degrees in one of their switch settings.

24. The birefringent interferometer of claim 19, wherein the fixed retarders are oriented with their fast axes at 45 degrees relative to the polarization axis of one of the two states of polarization.

25. The birefringent interferometer of claim 18, comprising a plurality of fixed retarders having substantially equal retardance.

26. The birefringent interferometer of claim 25, comprising N fixed retarders and N+1 optical switches.

27. The birefringent interferometer of claim 26, where the switches are variable retarders having a retardance that is adjustable from substantially 0 to substantially one half wave, and a fixed fast axis orientation which is oriented along one of the angles +22.5, −22.5, +67.5, and −67.5 degrees, relative to the polarization axis of one of the two states of polarization.

28. The birefringent interferometer of claim 18, comprising N fixed retarders and N+1 polarization rotators.

29. The birefringent interferometer of claim 28, wherein the N fixed retarders have substantially equal retardance.

30. The birefringent interferometer of claim 28, wherein the N fixed retarders have a substantially binary ratio of retardances.

31. The birefringent interferomter of claim 18, further comprising a retardance sensor that measures the optical path delay produced by the variable retarder element.

32. The birefringent interferometer of claim 18, further comprising: p1 polarization-sensitive optical elements for substantially increasing an optical efficiency of the interferometer by separating orthogonally polarized components of the incident light before the incident light enters the variable retarder element and rejoining the orthogonally polarized components before they enter the photodetector.

33. The birefringent interferometer of claim 32, wherein the polarization-sensitive optical elements comprise:

a first polarizing beamsplitter for splitting the incident light into a first and second orthogonally polarized components, wherein the first component is directed towards the variable retarder element;

a first mirror for reflecting the second component into the variable retarder element; and a second mirror for reflecting the first component after it exits the variable retarder element; and wherein the polarizer comprises a second polarizing beamsplitter for receiving the second component after it exits the variable retarder element and the first component from the second mirror.

34. The birefringent interferometer of claim 33, further comprising a half-wave retarder, adjacent to one of the entrance and exit faces of the variable retarder element, which transforms the state of polarization of light passing through it to the complementary state of polarization.

35. A method of performing Fourier Transform spectroscopy on an incident light having a first component having a first state of polarization and second component having a second state of polarization orthogonal to the first state of polarization, comprising:

continuously adjusting an optical path delay between the first and second components by changing a retardance of a variable retarder element, wherein the optical path delay varies from zero to multiple wavelengths;

combining the first and second components of light thereby causing the first and second components to interfere;

measuring an intensity of the combined light over time; and performing Fourier Transform analysis on the intensity measurements in order to determine spectral properties of the incident light.

* * * * *